United States Patent
Pu et al.

(10) Patent No.: US 10,409,651 B2
(45) Date of Patent: Sep. 10, 2019

(54) INCREMENTAL WORKFLOW EXECUTION

(71) Applicant: Microsoft Technology Licensing, LLC, Redmond, WA (US)

(72) Inventors: Wen Pu, Santa Clara, CA (US); Liqin Xu, Fremont, CA (US); Rohan Ramanath, Saratoga, CA (US); Kun Liu, San Jose, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 108 days.

(21) Appl. No.: 15/706,225

(22) Filed: Sep. 15, 2017

(65) Prior Publication Data
US 2019/0087238 A1    Mar. 21, 2019

(51) Int. Cl.
*G06F 9/46*    (2006.01)
*G06F 9/50*    (2006.01)
*G06F 16/23*   (2019.01)

(52) U.S. Cl.
CPC .............. *G06F 9/5088* (2013.01); *G06F 9/50* (2013.01); *G06F 16/2322* (2019.01)

(58) Field of Classification Search
None
See application file for complete search history.

*Primary Examiner* — Gregory A Kessler
(74) *Attorney, Agent, or Firm* — Hickman Palermo Becker Bingham LLP; Daniel D. Ledesma

(57) ABSTRACT

Techniques for incremental workflow execution are provided. In one technique, a computing job in a workflow identifies an input path that indicates a first location from which the computing job is to read input data. The computing job identifies an output path that indicates a second location to which the computing job is to write output data. The computing job performs a comparison between the input path and the output path. Based on the comparison, the computing job determines whether to read the input data from the first location. If the input path does not correspond to the output path, then the computing job reads the input data from the first location, generates particular output data based on the input data, and writes the particular output data to the second location. The computing job ceases to execute if the input path corresponds to the output path.

19 Claims, 5 Drawing Sheets

INCREMENTAL WORKFLOW EXECUTION

TECHNICAL FIELD

The present disclosure relates generally to executing computer jobs in a workflow and, more specifically, to improving the efficiency of workflow execution in a computing environment.

BACKGROUND

Processing large amounts of data is a common practice for small and large enterprises alike. There are multiple ways to process "big data," including writing a single monolithic program that takes input from one or more sources, performs a series of operations on the input and on intermediate results, and generates a final result. However, such an approach may take a long time to implement, especially if the operations are many and complex.

Another approach involves implementing a workflow that comprises multiple computer jobs. A computer job (or simply "job") is a unit of work. A component of a job is called a task or step. Each job corresponds to a different set of one or more operations that is required to finally generate a valid output at the end of the workflow.

An advantage of this approach is that each job may be implemented by a different person or different group of people. Each job needs to be able to read input data and write output data in a format that a consumer of the output data (e.g., another job in the workflow) is expecting.

One approach for implementing a workflow is for a job scheduler to start each job in the workflow when the input for that job is assured of being ready to read and process. The job scheduler detects when the job completes and, in response, initiates the next job in the workflow. For example, the job notifies the job scheduler that the job is finished. This ensures that a job reads complete and consistent data. Otherwise, each subsequent job in the workflow is likely to crash/fail altogether or, worse, produce incomplete and inconsistent output that is difficult to locate during a debug of the workflow, presuming a problem in the data is eventually identified, in which case much damage may have already been done.

Thus, current approaches to implementing workflows rely on a sequential paradigm where each iteration of a workflow requires the last job in a prior execution to complete before the first job in a current execution begins. Another approach is to run multiple executions of a workflow in parallel. However, this has disadvantages that are not easily handled. For example, job B in a first execution of a workflow is taking a relatively long time to execute, then job A (which precedes job B in the workflow) in a second execution of the workflow might write partial data that job B is not expecting or that job B ends up reading, which may cause job B to crash or (in potentially worse scenarios) produce invalid output for job C.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for increasing efficiency of workflows in a distributed system. Instead of relying on a sequential workflow paradigm, computer jobs in a workflow operate independent of other computer jobs in the workflow. Each computer job in a workflow is not required to be notified that a previous computer job in the workflow has completed. Thus, computer jobs in a workflow are not required to be aware of other computer jobs in the workflow, nor is a scheduler required to keep track of dependencies among computer jobs in the workflow. This allows computer jobs to execute whenever they are initiated (e.g., regularly at certain time intervals) A determination whether to continue executing may be made by each computer job checking their respective input data sources and output data sources before executing their respective primary logic. If an output data source indicates that the work of a computer job has already been done, then the computer job exits or ceases execution. Otherwise, computer job proceeds to execute its primary logic.

Input paths and output paths are described herein are in the context of time periods, such as days or hours. Embodiments are not so limited. For example, input paths and output paths may use a different naming convention, such as monotonically increasing numbers or alpha characters.

Workflow

Figure 1:
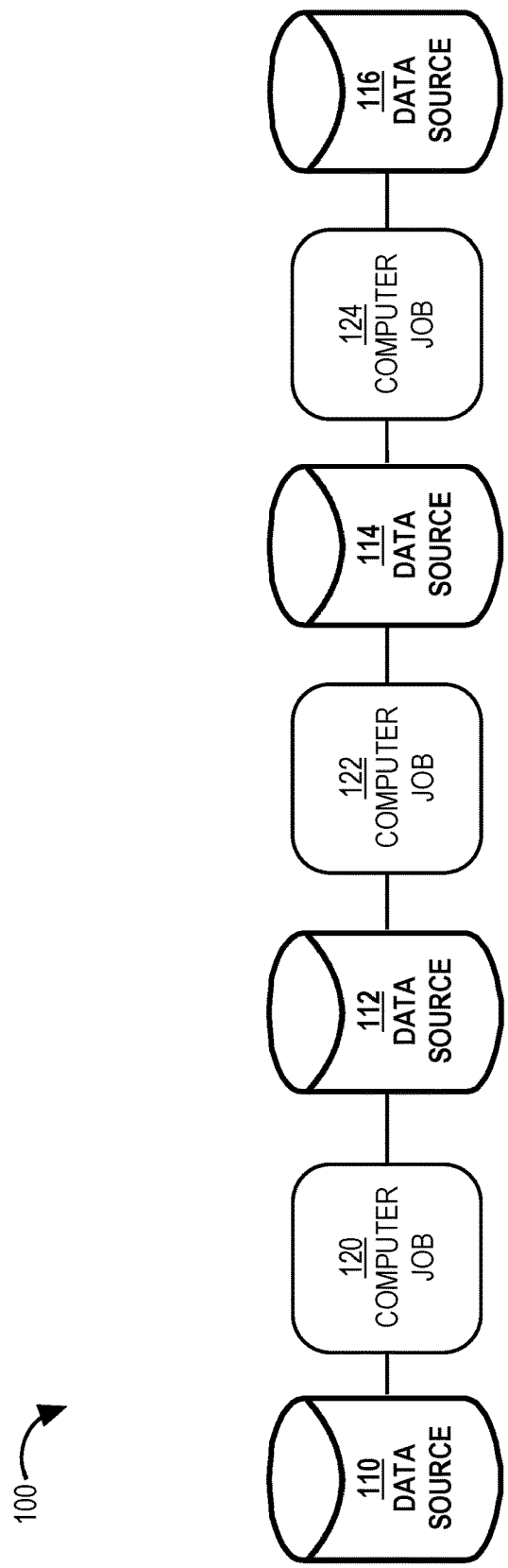
FIG. 1 is a block diagram that depicts an example workflow.

FIG. 1 is a block diagram that depicts an example workflow 100 that comprises data sources 110-116 and computer jobs 120-124. A workflow reflects a logical flow of work that is performed by different jobs. For example, job 120 may perform deduplication of events, job 122 may join the deduplicated events with another set of events, job 124 may downsample some of the deduplicated events, another job may join the deduplicated events with feature sources, another job may apply transformations on the features, another job may train a prediction model, and another job may push model coefficients to a production environment. The primary logic that a job executes is referred to as the "business logic" of the job.

Jobs can be started interactively, such as from a command line, or scheduled for execution by a job scheduler, and then controlled via automatic or manual job control. Jobs that have finite input can complete, successfully or unsuccessfully, or fail to complete and eventually be terminated.

A data source contains data that may be organized as records (or rows), objects, or keys (as in a key-value store). Example data sources include file systems and databases. Two different data sources may be part of the same physical storage system. For example, data source 110 and 112 may be part of the same database or file system. Additionally or alternatively, a single data source may be distributed among multiple storage media.

A data source may act as a source of input for one job and a destination for output for another job. In FIG. 1, job 120 retrieves input from data source 110 and generates output that is stored in data source 112. Job 122 retrieves input from data source 112 and generates output that is stored in data source 114. Job 124 retrieves input from data source 114 and generates output that is stored in data source 116.

In other example workflows, a job may retrieve input from multiple data sources and/or store generated output to multiple data sources. Thus, while example workflow 100 comprises only three jobs and four data sources, other workflows may comprise many more jobs and many more data sources and one or more branches to and/or from a data source or job.

A workflow may be implemented on a distributed system, such as a distributed storage system. An example of a distributed storage system is Hadoop, which is an open-source software framework used for distributed storage and processing of large datasets using the MapReduce programming model. The distributed storage includes computer clusters built (typically) from commodity hardware.

Hadoop comprises a storage part, known as Hadoop Distributed File System (HDFS), and a processing part, which is a MapReduce programming model. Hadoop splits files into large blocks and distributes the large blocks across computing nodes in a cluster. Hadoop then transfers packaged code to computing nodes to process the data in parallel. This approach may take advantage of data locality, where computing nodes manipulate the data to which they have access. This allows the dataset to be processed faster and more efficiently than it would be in a more conventional supercomputer architecture.

In a distributed system environment, a single job may be executed on different (computing) machines and operate on a different portion of input data. Each time the single job is scheduled to execute, the number of machines that execute the job may be different. For example, ten machines may execute a job on a first execution of a workflow and, on a second execution of the workflow, only seven machines may execute the job. Each machine generates its own output and stores its output into a certain storage location. Each machine's output may indicate a number or value corresponding to that machine or to a portion of the input that that machine read in and processed. For example, in executing a particular job, one machine may generate output1.part, another machine may generate output2.part, and so forth. Once all the machines have finished generating output, the "partial" data files are combined into a single data file and subsequently made visible to other processes.

Process Overview

Figure 2:
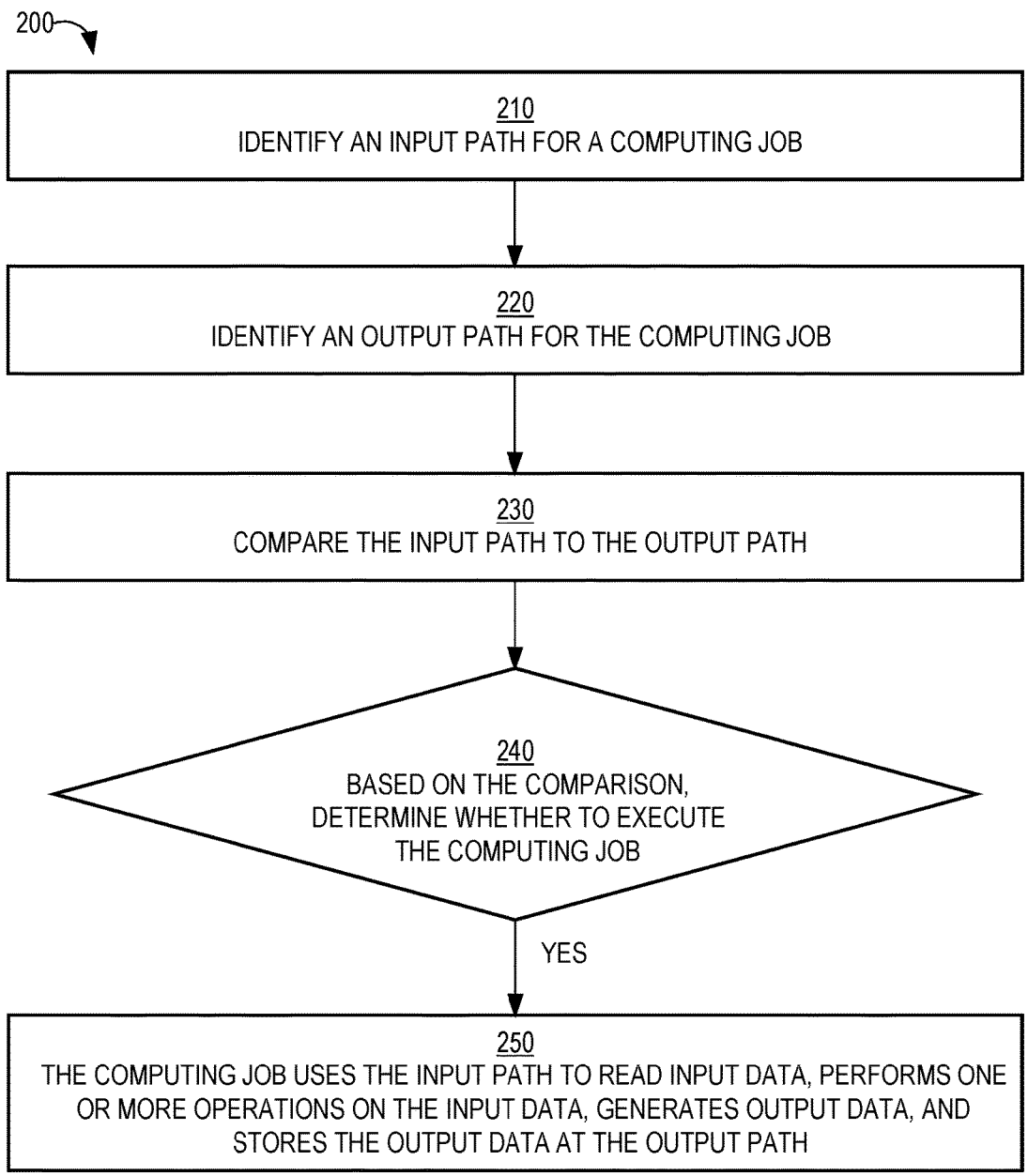
FIG. 2 is a flow diagram that depicts of a process for executing a job in a workflow, in an embodiment.

FIG. 2 is a flow diagram that depicts of a process 200 for executing a job in a workflow, in an embodiment. Process 200 may be implemented by the job itself. Process 200 may involve the job making a library call that is relied upon by multiple (e.g., all) jobs in a workflow to make a similar decision. For example, each job in a workflow may make a library call (whether static or dynamic) to a function that takes as input, an input path and an output path, both of which are described herein as follows. It is possible for an element other than the job itself to implement process 200. However, doing so would require building a complex centralized system or set of distributed systems that communicate with each other following a certain protocol. Embodiments herein involve a decentralized approach that is much simpler to implement and more robust.

At block 210, an input path that indicates a first location from which the job is to read input data is identified. The job may construct the input path based on internal logic of the job, such as determining a current date or time. An example input path is "/A/daily/2017/08/25." Other example input paths do not have a date structure. Identifying the input path may involving identifying the most recent folder using, for example, metadata associated with each of multiple folders and/or a name of one or more files within each of the folders.

At block 220, an output path that indicates a second location to which the job is to write output data is identified. Again, the job may construct the output path based on internal logic of the job. An example output path is "/B/daily/2017/08/24." Like input paths, other example output paths do not have a date structure. Identifying the output path may involving identifying the most recent output folder using, for example, metadata associated with each of multiple output folders and/or a name of one or more files within each of the output folders.

At block 230, a first comparison between the output path and the input path is performed. For example, the example input path above indicates a date that is after the date indicated by the example output path.

At block 240, based on the first comparison, it is determined whether the job will continue in order to complete execution. If so, then process 200 proceeds to block 250; otherwise, process 200 ends.

If the output path and the input path are the same or match (at least with respect to a particular time period), then the job may exit and cease executing. For example, if the output path and the input path indicate the same day (though one or more path names in the output path might not match one or more path names in the input path), then the job must have executed previously on the input data stored at a location indicated by the input path (or simply "input data stored at the input path") to generate the output path and store the output data at a location indicated by the output path (or simply "output data stored at the output path").

If the output path and the input path are not the same or do not match, then the job may continue executing by reading input data stored at the input path. For example, if the input path indicates a time period that is after a time period indicated by the output path (as in the above example paths), then that means the job has not processed the input data stored at the input path, or at least that the job has not generated the appropriate output and stored that output at the appropriate output path, which will be associated with a time period that succeeds the time period associated with the output path.

In a non-match scenario, the output path may be associated with (e.g., indicate or specify) a time period that is after a time period associated with the input path. In some implementations, such a scenario may be impossible or is not designed to occur. For example, an input path may have erroneously been deleted or a clock time determination may have become faulty. In such an issue arises, an error may be immediately reported so that this issue may be resolved.

At block 250, the job executes its business logic by reading input data stored at the input path, performing one or more operations on the input data, generating output data based on the one or more operations, and storing the output data at the output path.

Process 200 may repeat for each job in a workflow. In fact, multiple jobs in a workflow may be executing concurrently, each performing process 200, to determine whether to complete execution.

A job scheduler (or a subsequent job to a particular job) is not required to be notified when the particular job finishes (or to detect when the particular job finishes) before initiating the subsequent job. Instead, each job may begin at regular intervals (e.g., every hour, two hours, six hours, or 24 hours) or when instructed, whether manually or automatically. For example, job 120 may be initiated multiple times before job 122 is initiated, even though job 120 may have completed execution the first time it was initiated. In that situation, job 120 may determine to not execute its business logic each time after the first time or at least until new data is available for it to process. As another example, job 122 may be initiated before job 120 completes executing and generates output data that job 122 requires to read as input. In that situation, job 122 may cease to execute because input data is not yet available as determined by a comparison between an input path and an output path, both determined by job 122. Also, different jobs in a workflow may be initiated at different times.

Multiple Input Paths

In an embodiment, a job identifies (e.g., generates) multiple input paths and reads data from each identified input path as part of the job's business logic. The input paths may point to different data sources and even different storage media.

In an embodiment where the multiple input paths point to the same data source, then only the last input path may be considered in a comparison with the output path. For example, a job may consider the last three hours' worth of input data to generate a single set of output data. As a specific example, a job that is executing during the second hour of the day, the job considers input data from the following locations:
/A/hourly/2017/08/26/23
/A/hourly/2017/08/27/00
/A/hourly/2017/08/27/01
The job generates output data based on input data from these three locations and stores the output data at "/B/hourly/2017/08/27/01".

In an embodiment where the multiple input paths point to different data sources or different storage media, instead of comparing just one input path to an output path, multiple input paths are compared to the output path. For example, one input path indicates a time period that is after a time period indicated by the output path, while another input path indicates the same time period as the output path. Thus, the data source associated with the other input path might not be ready to process. Therefore, the job will cease executing and will be initiated (or "wake up") at a later time.

Additionally or alternatively, multiple input paths are compared to each other and, if they are not all associated with the same time period (e.g., indicate that same time period), then the job ceases to execute, presuming that the logic of the job requires input data associated with the same time period. Comparing multiple input paths to each other may be performed prior to comparing at least one input path with an output path.

Multiple Output Paths

In a related embodiment, a job identifies (e.g., generates) multiple output paths and writes data to each identified output path as part of the job's business logic. In this embodiment, the same input data is used to generate multiple (different) instances of output data, one for each output path. The output paths may point to different data sources and even different storage media. Each set of output data may be different from each other.

In this embodiment, instead of comparing just one output path to an input path, multiple output paths are compared to the input path. For example, the input path indicates a time period that is after a time period indicated by one output path, while the input path indicates the same time period as another output path. Thus, the data source associated with the other input path might not be ready to process. Therefore, the job will cease executing and will be initiated (or "woken up") at a later time.

Additionally or alternatively, multiple output paths are compared to each other and, if they are not all associated with the same time period (e.g., indicate that same time period), then the job ceases to execute, presuming that the logic of the job requires output data associated with the same time period. Comparing multiple output paths to each other may be performed prior to comparing at least one output path with an input path.

Multiple Instances of Input Data not Yet Processed

In an embodiment, a job determines that there are multiple sets (or instances) of input data to read, each set of input data corresponding to a different set (or instance) of output data. For example, an input path that a job determines is "/A/daily/2017/08/27" and an output path that the job determines is "/B/daily/2017/08/24." Thus, output data for days Aug. 25, 2017 through Aug. 27, 2017 are not yet available. Presuming that a typical execution of the job involves reading one day's worth of input data and generating one day's worth of output data, this means that the job may read three days' worth of input data and generate three days' worth of output data without having to be re-initiated for the second and third days' worth of input data. Alternatively, the job may end each time the job stores a day's worth of output data and effectively "wait" to be re-initiated later (e.g., by a job scheduler).

Updates to Previously Processed Data

In some environments, input data (e.g., data source 110) is being updated frequently. For example, a workflow is used to generate a prediction model that is used to calculate a predicted user selection rate of content items, where the original input comprises impression events and selection events. An impression event indicates that a content item was presented to an end-user. The impression event may include a unique ID for the content item, a unique ID for the end-user, a unique ID for a computing device that the end-user operated when the content item was presented to the end-user, a timestamp indicating when the event occurred, and geographic data indicating where the computing device was located when the event occurred. A selection event indicates that a content item was selected or viewed by an end-user and may contain the same type of data as an impression event. In an active system where impression and selection events are occurring constantly throughout each day, input data may be constantly updated.

For example, data source 110 contains impression events located at "/A/hourly/2017/08/27/01". When job 120 executes, job 120 reads the impression events stored at that location. After job 120 completes executing (or even while job 120 is executing), additional impression events may have been added to "/A/hourly/2017/08/27/01." Therefore, if job 120 generates output data that is stored at "/B/daily/2017/08/27/01", then that data may not be complete. Thus, job 120 should be notified that job 120 should execute again in order to process all impression events that occurred during the indicated time period.

Thus, in an embodiment, a job determines that input data that the job previously processed has been updated. In response to this determination, the job processes input data that is stored at the same location determined previously. One way that a job may determine that input data (that the job has been previously processed) has been updated (or contains changes that were not reflected in the previous version of the input data) is through a timestamp associated with the input data. The timestamp indicates when the input data (e.g., stored in a file) was created or last updated. The timestamp associated with the input data is compared to a timestamp associated with the output data that corresponds to the input data. For example, a timestamp of an input file stored at "/A/hourly/2017/08/27/01" is compared to a timestamp of an output file stored at "/B/hourly/2017/08/27/01."

If the input timestamp is after the output timestamp, then the job is executed again with respect to the updated input data. However, even if the input timestamp is before the output timestamp, the corresponding output data may be based on a previous version of the input data. Thus, in an embodiment, a buffer is considered when comparing the input timestamp with the output timestamp. For example, a buffer might be two hours. Thus, if the input timestamp plus the buffer is greater than the output timestamp, then the job presumes that the input data has been updated (even though the input data may not have been updated since the job last processed the input data) and proceeds to read the input data and execute its business logic relative to the input data.

Different jobs may be associated with different buffers. For example, a buffer for job 120 may be five hours while a buffer for job 122 may be two hours. Such a difference in buffers may be based on knowledge of the type of operations that each job performs and/or a length of execution time for each job.

Another way to determine that input data has been updated is through a name of a file that contains the input data. For example, a file name may be input1.txt and another file name in the same folder may be input2.txt, indicating that index2.txt reflects an update to input1.txt. If a name (e.g., a file name) for output data does not correspond to a name for input data (e.g., there is no output2.txt while there is an input2.txt), then it is presumed that input2.txt has not yet been processed previously in order to generate an output2.txt.

Multiple Sets of Updated Input Data

In an embodiment, a determination is made regarding multiple sets of input data from the same data source before a job proceeds. This determination may be performed by the job that is to read input data. Each set of input data may correspond to a different time period. For example, each set of input data is stored in a separate hourly folder as follows:
/A/hourly/2017/08/26/22
/A/hourly/2017/08/26/23
/A/hourly/2017/08/27/00
/A/hourly/2017/08/27/01
/A/hourly/2017/08/27/02
/A/hourly/2017/08/27/03
/A/hourly/2017/08/27/04

The determination may be of a certain number of sets of input data (e.g., six sets) or a certain time range in the past (e.g., last ten hours). The number of sets of input data that are considered may vary from job to job. For example, job 120 may consider the last ten hours, while job 122 may consider the last two hours.

Continuing with the above example input paths, when a job initiates, the job may consider the last seven hour time periods and determine whether the input data stored at each of the corresponding input paths has been updated. If so, then the job reads the updated input data from the appropriate input path, generates output data based on updated input data, and stores the output data at the appropriate output path. For example, it is determined that the input data at the following input paths have been updated:
/A/hourly/2017/08/26/22
/A/hourly/2017/08/27/00
/A/hourly/2017/08/27/01
/A/hourly/2017/08/27/02
/A/hourly/2017/08/27/03

Thus, the job reads the input data from each of these five input path locations and may generate five different sets of output data, each to be stored at a different output path location, such as the following:
/B/hourly/2017/08/26/22
/B/hourly/2017/08/27/00
/B/hourly/2017/08/27/01
/B/hourly/2017/08/27/02
/B/hourly/2017/08/27/03

Such processing may be performed once for each set of updated input data without, for example, the job needing to be initiated by another process (e.g., a job scheduler) between processing of each updated input data. Processing updated input data may be done even if the input data associated with the most recent time period (e.g., stored at "/A/hourly/2017/08/27/04") has already been processed in a last iteration of the job (i.e., not the current iteration) and corresponding output data has already been generated and stored (e.g., at "/B/hourly/2017/08/27/04") by that last iteration of the job.

Example Process that Considers Updated Input Data

Figure 3:
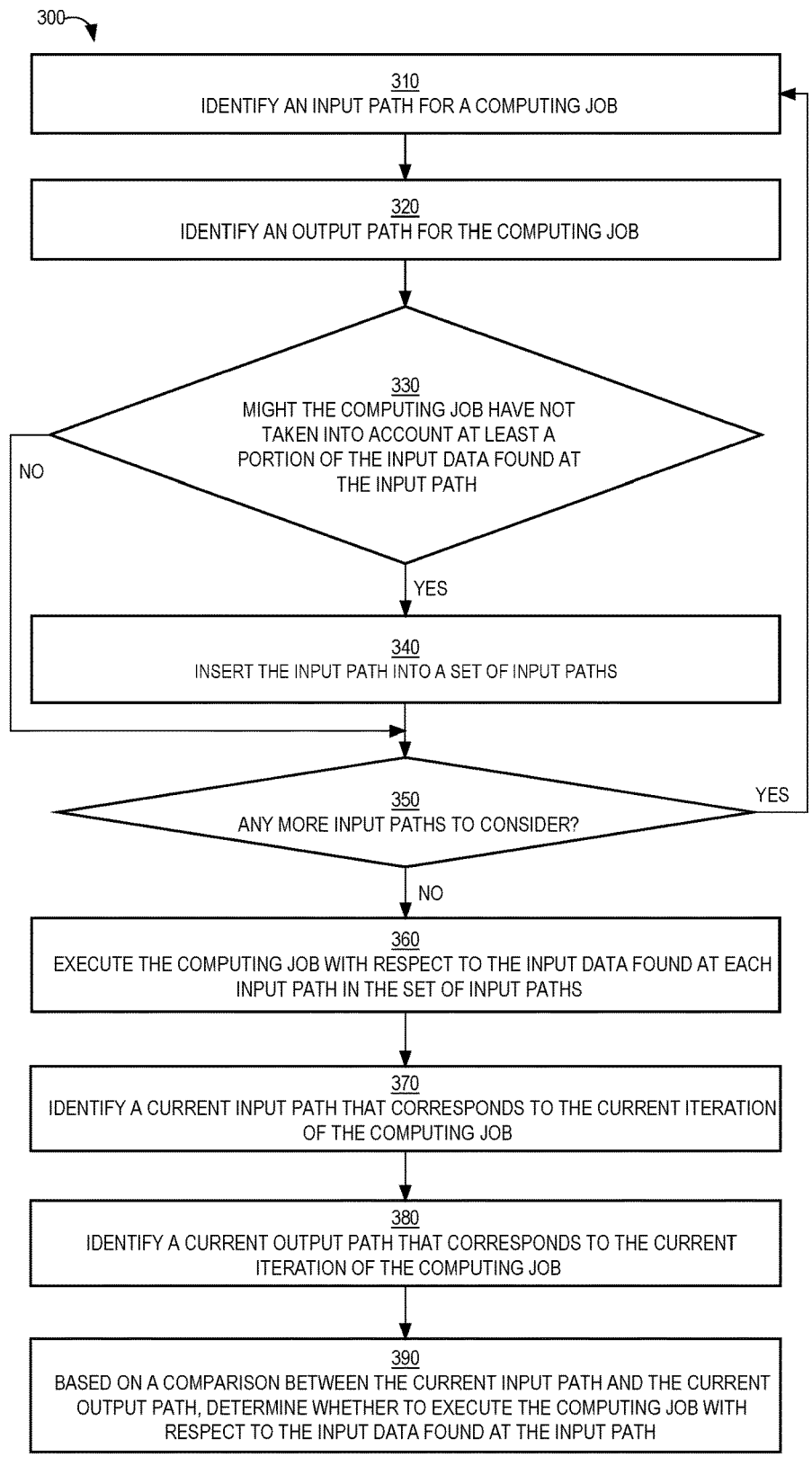
FIG. 3 is a flow diagram that depicts of a process for executing a job in a workflow where previously processed input data has been updated, in an embodiment.

FIG. 3 is a flow diagram that depicts of a process 300 for executing a job in a workflow where previously processed input data has been updated, in an embodiment. Process 300 may be performed by a job that is configured to read input data from one or more input paths, process the input data, and store the processed (or output) data at one or more output paths. Thus, process 300 may be performed each time a job in a workflow is initiated.

At block 310, an input path that indicates a first location from which a job is to read input data is identified. The input path that is identified in block 310 may be limited to an input path from which the job read previously in a prior iteration (or execution) of the job. Thus, input path identification logic (e.g., as part of the job) may be executed to identify the most recent input path and then identify an input path that corresponds to a time period prior to the most recent input path.

At block 320, an output path that indicates a second location to which the job is to write output data (based on the input data) is identified. The output path corresponds to the identified input path. Similar to block 310, the output path may be limited to an output path to which the job (in a previous iteration) stored output data.

At block 330, a determination is made regarding whether the job did not take into account (or might not have taken into account) at least a portion of the input data when generating the output data. Alternatively, the determination may be whether the input data has been updated since the last iteration of the job began. Such a determination may be performed by comparing (1) a timestamp associated with the input data to (2) a timestamp associated with the output data. The timestamp associated with the output data may be of when the output data was written or when the iteration of the job that generated the output data began, which may be before the generation of the output data. Either determination may take into account a buffer time period.

If the determination in block 330 is affirmative, then process 300 proceeds to block 340. Otherwise, process 300 proceeds to block 350.

At block 340, the input path is inserted into a set of input paths that is initially empty when process 300 begins.

At block 350, it is determined whether there are any more input paths to consider. If so, then process 300 returns to block 310 where a different input path is identified.

At block 360, for each input path in the set of input paths, the business logic of the job is executed with respect to the input data stored at that input path.

At block 370, an input path corresponding to the current iteration of the job is identified. For example, the current iteration of the job considers input data from "/A/hourly/2017/08/27/03" while one or more iterations of block 310 only considers input data from input paths that precede the $3^{rd}$ hour of Aug. 27, 2017, such as "/A/hourly/2017/08/27/02" and "/A/hourly/2017/08/27/01."

At block 380, an output path corresponding to the current iteration of the job is identified.

At block 390, the input path and the output path are compared to determine whether the job should execute its business logic. For example, if the input path of the current iteration of the job is "/A/hourly/2017/08/27/03" and the output path is "/B/hourly/2017/08/27/03", then the job may cease executing, unless the input data stored at "/A/hourly/2017/08/27/03" has been updated since the output data stored at "/B/hourly/2017/08/27/03" was generated. If the input path of the current iteration of the job is "/A/hourly/2017/08/27/03" and the output path is "/B/hourly/2017/08/27/02", then the job may continue executing in order to read input data from "/A/hourly/2017/08/27/03", generate output data, and store the output data in new output path "/B/hourly/2017/08/27/03".

With process 300, multiple scenarios are possible: (1) a current (or latest) input path has already been processed and does not contain updated input data and no prior input path contains updated input data; (2) a current (or latest) input path has already been processed and does contain updated input data, but no prior input path contains updated input data; (3) a current (or latest) input path has not yet been processed and no prior input path contains updated input data; and (4) a current (or latest) input path has not yet been processed and at least one prior input path contains updated input data. Only in (1) does the job not proceed to execute its business logic against any input data. Instead, the job will be initiated some time later and again perform the process of 300.

In a related embodiment, instead of block 310 being limited to identifying one or more input paths from which the job read previously in a prior iteration (or execution) of the job, block 310 may also identify the most recent input path. In that way, blocks 370-390 are unnecessary. However, if the current (or latest) input path does not yet have a corresponding output path, then block 320 would involve making that determination, block 330 would be skipped, and (in block 340) the current input path is inserted into the set of input paths, indicating that the job will be executed with respect to the input data stored at the current input path. For example, each job in a workflow may make a library call (whether static or dynamic) to a function that takes as input, multiple input paths that the job has identified and multiple output paths that the job has identified. The function may return a list of input paths whose respective input data needs to be read and processed by the job that invoked the function. [Is this accurate?] Thus, the function would perform blocks 330-350 for each pair of corresponding input-output paths and part of block 390 (if the current input path is considered separately from blocks 330-350).

Varying Time Periods

In an embodiment, an input path corresponds to a time period that is shorter than a time period of an output path to which processed input data from the input path is to be stored. For example, an input path (from which a job reads input data) may correspond to a particular hour of a particular day and an output path (to which the job stores output) may correspond to the particular day. In this example, if all 24 hourly folders exist for one day and that day is later than the latest output daily folder, then the corresponding hourly input paths will be included as input to the job. Otherwise, the job will not proceed, at least with respect to the input data stored in the 24 hourly folders.

Versioning

In an embodiment, a version of data (whether input data or output data) is created. Versioning may be indicated by a name, such as appending "_v1" or "—version 3" to the end of the name of a file for the input/output data. Alternatively, versioning may be indicated by a timestamp. When selecting input data from an input path to process, the selecting may be limited to selecting the latest version of the input data (e.g., as indicated by version data). Thus, if there are ten versions, then the latest version is selected without having to consider or process any of the prior nine versions.

When writing output data to an output path, if the output path already contains one or more versions of output data, then a file name of the output data is specified to indicate a new version. For example, if output_v1.txt already exists at an output path and a job is writing another set of output data to that output folder, then the job might write output_v2.txt to that output path.

In an embodiment, old versions are automatically deleted or otherwise removed from input paths and/or output paths that contain old versions. Such removal helps control usage of storage (e.g., disk space) and the footprint of the name space. Old version removal may occur at regular intervals, such as every day or week. Different paths may be analyzed for version removal at different times or at different intervals. For example, hourly paths may be analyzed every day for version removal while daily paths may be analyzed every three days for version removal.

Benefits

Embodiments described herein effectively decouple jobs in a workflow from one another. In this paradigm, there is no sequential limitation, meaning that a job in a workflow may begin at any time but does not necessarily fully execute, only when the required input data is ready and it is known that the corresponding output data has not yet been generated. Thus, throughput is improved and a centralized scheduler that keeps track of each job in a workflow execution is not required.

Figure 4A:
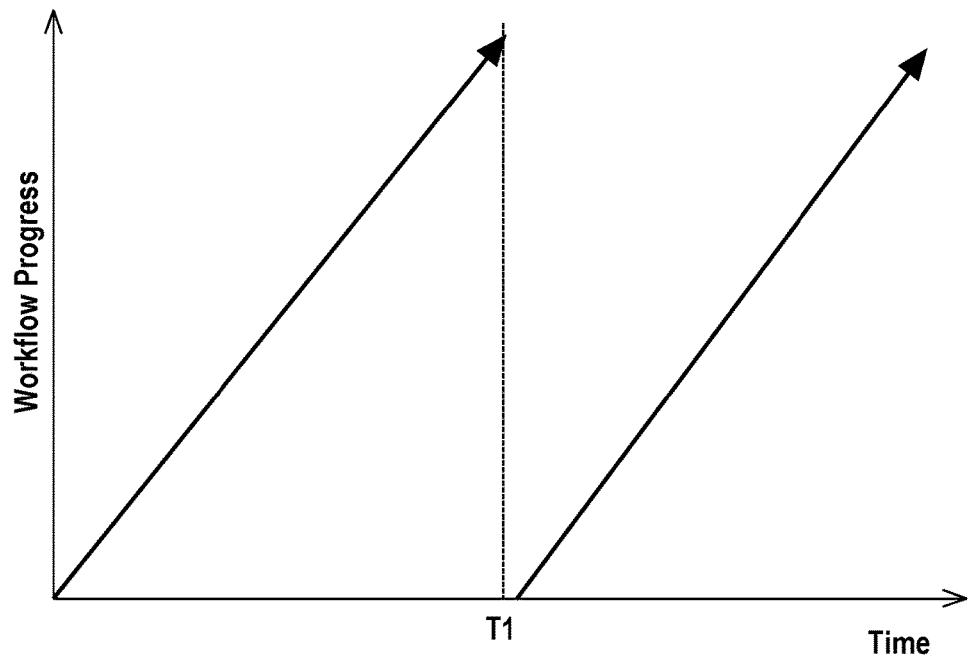
FIG. 4A is a chart that depicts a sequential workflow execution.

FIG. 4A is a chart 400 that depicts a sequential workflow execution. Chart 400 has a time axis and a workflow execution axis that indicates a progress of a workflow's execution. As time increases, workflow execution increases. Chart 400 includes a line for execution 410 and a line for execution 420. Execution 420 cannot begin until execution 410 ends, which is at time T1.

While the slope of the respective lines in chart 400 is fixed, the progress of an actual workflow's execution may vary greatly overtime, where some jobs within an execution may take much longer than other jobs. Such varying of an execution's progress may be due to each job performing a different amount of work, since each job performs a different set of operations relative to each other job in a workflow.

Also, while FIG. 4A depicts executions 410 and 420 as taking the same amount of time, different executions of the same workflow may vary greatly from one execution to another. Such varying executions may be due to different amounts of input data being processed and different resource availability. For example, one execution of workflow involves twenty servers executing a particular job (in the workflow) while a subsequent execution of the workflow involves to only eight servers executing that particular job.

Figure 4B:
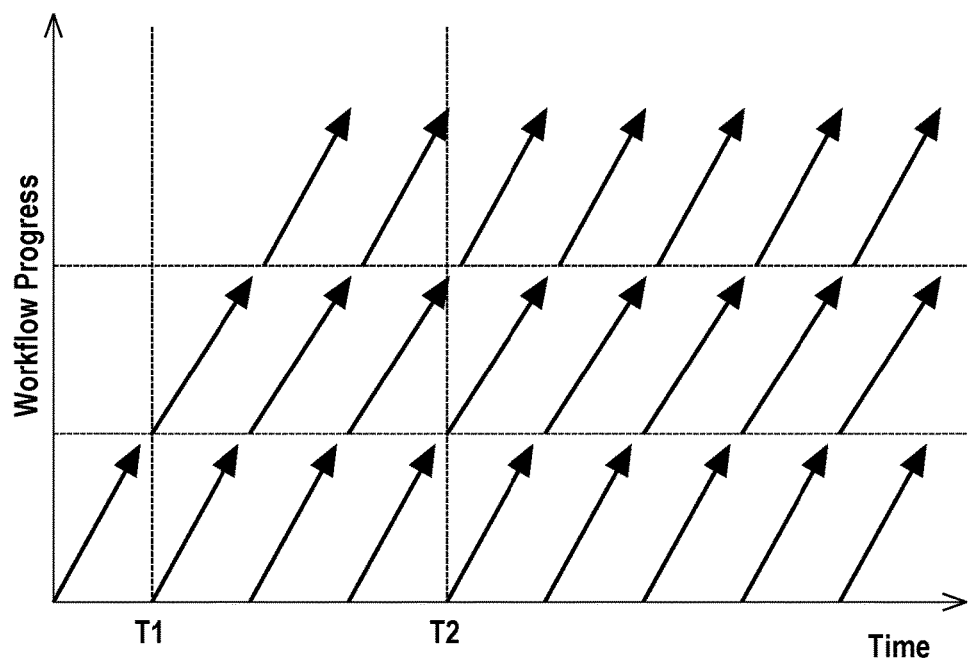
FIG. 4B is a chart that depicts multiple jobs executing individually as part of an incremental workflow execution, in an embodiment.

FIG. 4B is a chart 450 that depicts multiple jobs executing individually as part of an incremental workflow execution, in an embodiment. Like Chart 400, Chart 450 comprises a time axis and a workflow execution axis. Because jobs are decoupled from the sequential nature of a workflow, a job can execute even though the current workflow "execution" (to which the job "belongs") has not yet completed.

In the depicted example, one workflow comprises three jobs and a single workflow execution comprises three job executions. Execution 462 is of a first job, execution 464 is of a second job, and execution 466 is of a third job. Execution 464 cannot begin until execution 462 completes (or generates the output data that execution 464 requires for input) and execution 466 cannot begin until execution 464 completes (or generates the output data that execution 466 requires for input).

Executions 462 and 464 utilize data access layer 452 and executions 464 and 466 utilize data access layer 454. Execution 462 utilizes data access layer 452 to write output data and execution 464 utilizes data access layer 452 to read that output data. Similarly, execution 464 utilizes data access layer 454 to write output data and execution 466 utilizes data access layer 454 to read that output data. While data access layers are not depicted in FIG. 4A, workflow executions 410 and 420 may similarly rely upon one or more data access layers.

Executions 462-466 correspond to a single workflow execution that begins at time T1 and ends at time T2. As depicted in chart 450, a subsequent execution of the workflow essentially begins prior to time T2 in the form of job execution 468 and is partially complete at time T2. Thus, while the time required to complete the first execution of a workflow in an incremental manner may be the same as the time required to complete the first execution of the workflow in a sequential manner, the time required to complete a subsequent execution of the workflow using the incremental approach is significantly reduced; thus, improving workflow execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
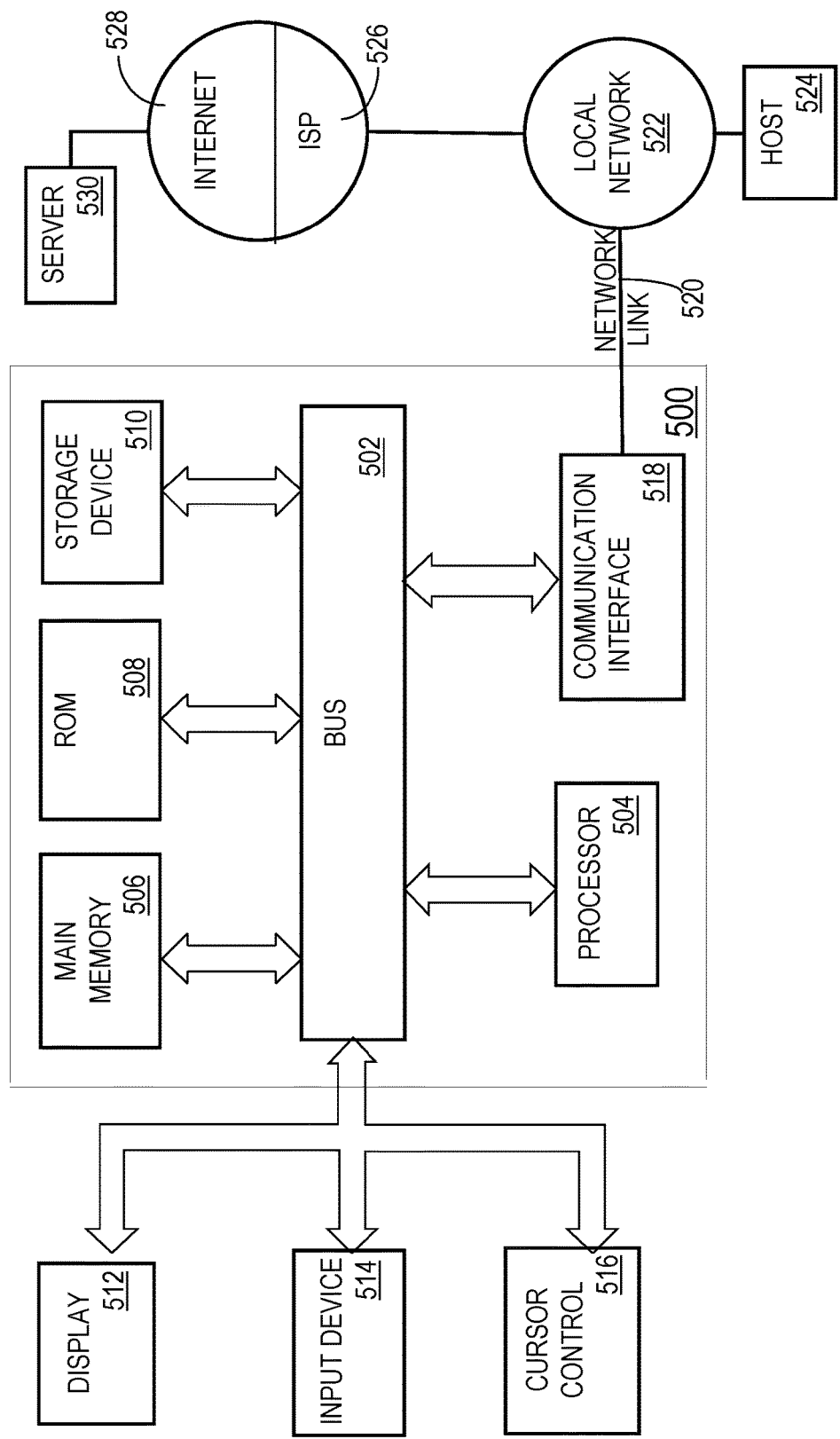
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
     identifying an input path that indicates a first location from which a first computing job is to read input data;
     identifying an output path that indicates a second location to which the first computing job is to write output data;
     performing a first comparison between the output path and the input path;
     based on the first comparison, determining whether the first computing job will process the input data from the first location;
     determining a first timestamp that indicates when an input file in a third location has been updated;
     determining a second timestamp that indicates when an output file has been created;
     performing a second comparison between the first timestamp and the second timestamp;
     based on the second comparison, determining whether the first computing job will read the input file from the third location.

2. The system of claim 1, wherein the instructions, when executed by the one or more processors, further cause:
   in response to determining that the first timestamp indicates a time period that is after a time period indicated by the second timestamp, reading the input file from the first location and processing data within the input file.

3. The system of claim 2, wherein the instructions, when executed by the one or more processors, further cause:
reading the input data from the first location and processing the input data in addition to the data within the input file.

4. The system of claim 1, wherein the instructions, when executed by the one or more processors, further cause:
identifying a plurality of versions of the input file;
wherein each version of the plurality of versions is associated with a different creation time;
wherein the first timestamp is of the most recent version of the plurality of versions.

5. The system of claim 1, wherein the input path specifies a first particular time period and the output path specifies a second particular time period.

6. The system of claim 1, wherein the instructions, when executed by the one or more processors, further cause:
based on the first comparison, determining to not complete execution of the first computing job with respect to the input data.

7. The system of claim 1, wherein the instructions, when executed by the one or more processors, further cause:
identifying a plurality of input paths, wherein each input path in the plurality of input paths indicates an input location from which a second computing job is to read certain input data;
identifying a plurality of output paths, wherein each output path in the plurality of output paths indicates an output location to which the second computing job is to write certain output data;
wherein each input path in the plurality of input paths corresponds to a different output path in the plurality of output paths;
for each input path in the plurality of input paths:
determining an input timestamp that indicates when a particular input file in a location indicated by said each input path was updated;
determining an output timestamp that indicates when a particular output file in a location indicated by an output path that corresponds to said each input path was created;
performing a particular comparison between the input timestamp and the output timestamp;
based on the particular comparison, determining whether to add said each input path to a set of updated input paths;
for each input path in the set of updated input paths, executing the second computing job with respect to input data that is stored at the input location indicated by said each input path.

8. A system comprising:
one or more processors;
one or more storage media storing instructions which, when executed by the one or more processors, cause:
identifying an input path that indicates a first location from which a first computing job is to read input data;
identifying an output path that indicates a second location to which the first computing job is to write output data;
performing a comparison between the input path and the output path;
based on the comparison, determining whether to read the input data from the first location;
if the input path does not correspond to the output path, then the first computing job:
reading the input data from the first location,
generating particular output data based on the input data;
writing the particular output data to the second location;
wherein the first computing job ceases to execute if the input path corresponds to the output path.

9. The system of claim 8, wherein the input path corresponds to the output path if the input path indicates a time period that is within or is the same as a time period indicated by the output path.

10. The system of claim 9, wherein the input path specifies a first particular time period and the output path specifies a second particular time period.

11. The system of claim 8, wherein:
the first computing job is one of a plurality of computing jobs in a workflow;
a second computing job in the plurality of computing jobs is configured to read output generated by the first computing job.

12. The system of claim 8, wherein the instructions, when executed by the one or more processors, further cause:
identifying a plurality of input paths, wherein each input path in the plurality of input paths indicates an input location from which the first computing job is to read certain input data;
identifying a plurality of output paths, wherein each output path in the plurality of output paths indicates an output location to which the first computing job is to write certain output data;
wherein each input path in the plurality of input paths corresponds to a different output path in the plurality of output paths;
for each input path in the plurality of input paths:
determining an input timestamp that indicates when a particular input file in a location indicated by said each input path was updated;
determining an output timestamp that indicates when a particular output file in a location indicated by an output path that corresponds to said each input path was created;
performing a particular comparison between the input timestamp and the output timestamp;
based on the particular comparison, determining whether to add said each input path to a set of updated input paths;
for each input path in the set of updated input paths, executing the first computing job with respect to input data that is stored at the input location indicated by said each input path.

13. A method comprising:
identifying an input path that indicates a first location from which a first computing job is to read input data;
identifying an output path that indicates a second location to which the first computing job is to write output data;
performing a first comparison between the output path and the input path;
based on the first comparison, determining whether the first computing job will process the input data from the first location;
determining a first timestamp that indicates when an input file in a third location has been updated;
determining a second timestamp that indicates when an output file has been created;
performing a second comparison between the first timestamp and the second timestamp;

based on the second comparison, determining whether the first computing job will read the input file from the third location;

wherein the method is performed by one or more computing devices.

14. The method of claim 13, further comprising:

in response to determining that the first timestamp indicates a time period that is after a time period indicated by the second timestamp, reading the input file from the first location and processing data within the input file.

15. The method of claim 14, further comprising:

reading the input data from the first location and processing the input data in addition to the data within the input file.

16. The method of claim 13, further comprising:

identifying a plurality of versions of the input file;

wherein each version of the plurality of versions is associated with a different creation time;

wherein the first timestamp is of the most recent version of the plurality of versions.

17. The method of claim 13, wherein the input path specifies a first particular time period and the output path specifies a second particular time period.

18. The method of claim 13, further comprising:

based on the first comparison, determining to not complete execution of the first computing job with respect to the input data.

19. The method of claim 13, further comprising:

identifying a plurality of input paths, wherein each input path in the plurality of input paths indicates an input location from which a second computing job is to read certain input data;

identifying a plurality of output paths, wherein each output path in the plurality of output paths indicates an output location to which the second computing job is to write certain output data;

wherein each input path in the plurality of input paths corresponds to a different output path in the plurality of output paths;

for each input path in the plurality of input paths:
  determining an input timestamp that indicates when a particular input file in a location indicated by said each input path was updated;
  determining an output timestamp that indicates when a particular output file in a location indicated by an output path that corresponds to said each input path was created;
  performing a particular comparison between the input timestamp and the output timestamp;
  based on the particular comparison, determining whether to add said each input path to a set of updated input paths;

for each input path in the set of updated input paths, executing the second computing job with respect to input data that is stored at the input location indicated by said each input path.

* * * * *